Patented Apr. 17, 1934

1,954,800

UNITED STATES PATENT OFFICE 1,954,800

PAPER-MAKING

Howard M. Cyr, Palmerton, Pa., and Otto Kress, Appleton, Wis., assignors to The New Jersey Zinc Company, New York, N. Y., a corporation of New Jersey No Drawing. Application April 17, 1933,
Serial No. 666,507

5 Claims. (Cl. 92—21)

This invention relates to the manufacture of paper, and has for its object the provision of certain improvements in paper making. More particularly, the invention aims to provide certain improvements in the sterilization of the white water from the paper making operation.

In the manufacture of paper the water leaving the paper making machines (such as the Fourdrinier, Harper, Yankee, cylinder, or any standard type of paper-making machine) carries with it in suspension paper fibers as well as a certain amount of any fillers or pigments that may have been incorporated with the paper pulp. This water is called "white water". The disposal of white water is a problem in the paper industry. If run to waste, it carries with it a substantial percentage of the paper pulp and other paper making materials, thus leading to substantial losses, and furthermore pollutes to a dangerous extent on account of its paper fiber content any streams into which it is permitted to flow. In view of the loss of material and stream contamination brought about by permitting the white water to run to waste, the most efficient way of operating a paper mill is to recirculate the white water, in a closed system. This method of operating not only has the advantage of saving the paper making materials carried in suspension in the water and preventing stream contamination, but also results in a saving with respect to the amount of water used.

However, when the white water is so recirculated, difficulties are encountered due to the growth of bacteria and similar organisms therein. The cellulosic materials of which paper is made afford a favorable medium for the growth of such organisms. Under these conditions, the paper pulp becomes contaminated with slime formed by these organisms and likewise with slime residues which collect in the screens, head boxes, and other parts of the paper-making equipment and storage system.

The growth of bacteria and similar organisms in paper mills is however not confined to those mills that recirculate the white water, though difficulties of this nature are most severe when the white water is recirculated. Bacteria and the like may grow with resulting slime formation in any relatively stagnant part of the paper mill system, where cellulosic materials can collect in contact with water.

The use of various disinfectants has been heretofore recommended for the purpose of preventing slime formation. Thus the sterilization of the paper pulp and the water used in paper mills by adding chlorine or chlorine and ammonia is practiced. Other disinfectants such as formaldehyde are also used. However, the effect of disinfectants such as chlorine and the like is transient, and therefore they cannot be relied upon to maintain sterile conditions throughout the entire paper-making system. Furthermore, disinfectants such as chlorine are likewise strong bleaching agents, and may interfere with the subsequent tinting of the paper.

We have discovered that zinc pigments, and in particular pigments containing zinc sulphide, possess effective germicidal or disinfecting properties with respect to the constituents of white water, and when present in the white water serve to effectively decrease the activity of bacteria and similar organisms. Based on this discovery, our present invention contemplates the treatment of white water with a zinc pigment, preferably a zinc sulphide pigment, as for example by incorporating the zinc pigment in the paper pulp stock preparatory to its transfer to the web-forming device of the paper making machine. By thus incorporating in the paper pulp stock from 1 to 10% by weight of the zinc pigment on the dry weight of the cellulosic material in the stock, an adequate amount of the zinc pigment is carried away with and included in the white water from the paper making operation to effectively sterilize and disinfect it.

In carrying out the invention, it is our preferred practice to use a zinc pigment consisting mainly of or containing a substantial proportion of zinc sulphide, such as pigment zinc sulphide (consisting essentially of zinc sulphide) ordinary lithopones (composed of mixtures in various proportions of zinc sulphide and barium sulphate), the calcium base lithopones (composed of mixtures in various proportions of zinc sulphide and calcium sulphate), and lithopone-like pigments (composed, for example, of zinc sulphide and an alkaline earth metal carbonate). On the other hand, other zinc pigments such as zinc oxide may be used in the practice of the invention.

The incorporation of the zinc pigment in the paper pulp stock, in accordance with the invention, prevents the growth of bacteria and the like in either the paper pulp stock or the white water. White water containing a zinc pigment may be recirculated without risk of contamination with slime, in consequence whereof the mill can be operated as a closed system, and the white water recirculated almost indefinitely without the formation of slime, with resulting economy in operation and avoidance of loss of paper pulp and other paper making materials.

The addition of zinc sulphide and zinc oxide pigments to paper pulp stock results in the incorporation of the pigment in the finished paper. The zinc pigment imparts an added degree of opacity to the paper and in the quantities necessary for sterilization, the pigment does not appreciably decrease the strength of the paper. From 1 to 10% of a zinc pigment, such as zinc sulphide pigment, may thus be advantageously incorporated in paper.

The zinc sulphide, lithopone, zinc oxide, or other appropriate zinc pigment, or mixtures of such pigments, is preferably added to the paper pulp stock in the beaters or other mixing devices at any appropriate stage in the paper making process preceding the transfer of the stock to the web-forming device of the paper-making machine. If desired, the zinc pigment may be mixed with the white water itself.

Under certain conditions, zinc sulphide pigments may be stained and discolored by copper compounds formed by the corrosion of the copper parts of the paper making machines, as for example, the copper web of the Fourdrinier machine or the copper lining of the beaters. In the copending application of one of us (Cyr, Serial No. 666,506, filed April 17, 1933), there is disclosed an improved method of incorporating a zinc sulphide pigment in paper pulp stock in which such staining and discoloration of the zinc sulphide pigment is overcome or decreased until practically negligible. Thus, in accordance with the invention of that application, the time of contact between the zinc sulphide pigment and the liquor in the paper pulp stock is reduced to the minimum time practicable, and the hydrogen ion concentration of the liquor is controlled and regulated so that its pH value does not fall below 4.5, and preferably is maintained above 5.0. The pH value of the liquor may be controlled in any appropriate manner, as for example by regulating the addition to the paper pulp stock of paper-makers' alum (aluminum sulphate), or by adjusting and controlling the pH value of the recirculating white water.

Simultaneous control of the hydrogen ion concentration of the liquor in the paper pulp stock and of the duration of contact between the pigment and the liquor may be advantageously effected as follows: The paper pulp stock is sized in the beater by the addition of alum, or other appropriate sizing agent, in such amount as to establish a pH value not lower than about 4.5, care having been taken to wash the beater beforehand with fresh water to remove any soluble copper compounds. Just before dumping the stock from the beater the zinc sulphide pigment is mixed into the stock. The stock is then diluted with fresh water (or with recirculated white water treated, if necessary, with alkali to appropriately raise the pH value) until the pH value of the liquor in the stock is raised to 5.0 or higher. The stock is then transferred to the Fourdrinier machine, which is preferably kept relatively free from soluble copper compounds by flushing with water preparatory to use.

In the appended claims, the term "zinc sulphide pigment" is intended to include not only substantially pure zinc sulphide in pigment form, but also ordinary lithopones, calcium base lithopones, lithopone-like pigments and in general all pigments containing a substantial proportion of zinc sulphide.

We claim:

1. In the manufacture of paper, the improvement in the treatment of white water which comprises incorporating a zinc pigment in paper pulp stock in such amount that the white water from the paper-making operation contains a sufficient amount of the zinc pigment to effectively sterilize it.

2. In the manufacture of paper, the improvement in the treatment of white water which comprises incorporating a zinc sulphide pigment in paper pulp stock in such amount that the white water from the paper-making operation contains zinc sulphide in sufficient amount to effectively decrease bacterial activity therein.

3. In the manufacture of paper, the improvement in the sterilization of white water from the paper-making operation which comprises subjecting the white water to the action of a zinc pigment.

4. In the manufacture of paper, the improvement in the sterilization of white water from the paper-making operation which comprises subjecting the white water to the action of a zinc sulphide pigment.

5. In the manufacture of paper, the improvement in the sterilization of white water from the paper-making operation which comprises subjecting the white water to the action of a zinc sulphide pigment while maintaining a pH value not lower than 4.5.

HOWARD M. CYR.
OTTO KRESS.